US012158733B2

(12) United States Patent
Kakimi

(10) Patent No.: US 12,158,733 B2
(45) Date of Patent: Dec. 3, 2024

(54) CALENDAR

(71) Applicant: Tomio Kakimi, Shiga (JP)

(72) Inventor: Tomio Kakimi, Shiga (JP)

( * ) Notice: Subject to any disclaimer, the term of this patent is extended or adjusted under 35 U.S.C. 154(b) by 342 days.

(21) Appl. No.: 17/799,275

(22) PCT Filed: Feb. 10, 2021

(86) PCT No.: PCT/JP2021/005117
§ 371 (c)(1),
(2) Date: Aug. 12, 2022

(87) PCT Pub. No.: WO2021/162067
PCT Pub. Date: Aug. 19, 2021

(65) Prior Publication Data

US 2023/0081165 A1 Mar. 16, 2023

(30) Foreign Application Priority Data

Feb. 13, 2020 (JP) ................................ 2020-022124
Sep. 25, 2020 (JP) ................................ 2020-160609

(51) Int. Cl.
*G04G 9/00* (2006.01)
*G04B 47/00* (2006.01)
*G04G 9/08* (2006.01)

(52) U.S. Cl.
CPC ............ *G04G 9/085* (2013.01); *G04B 47/00* (2013.01); *G04G 9/00* (2013.01)

(58) Field of Classification Search
CPC ........ G04B 19/24313; G04B 19/24306; G04B 19/243; G04B 47/00; G04C 17/041; G04G 9/085; G04G 9/00
USPC ......................... 116/224, 292, 300; D10/126
See application file for complete search history.

(56) References Cited

U.S. PATENT DOCUMENTS 3,696,609 A * 10/1972 Dubois ................ G04B 19/082 968/150
5,043,955 A * 8/1991 Dubois ................ G04B 19/087 368/228
2004/0233788 A1* 11/2004 Plancon .................... G04F 7/08 368/11
2006/0280037 A1* 12/2006 Houlon .................. G04C 3/146 368/110
2008/0106979 A1* 5/2008 Bron ...................... G04B 19/25 368/190
2008/0159082 A1* 7/2008 Hiraga .................. G04B 19/24 368/228
2010/0046328 A1* 2/2010 Olsen .................. G04G 9/0082 368/80
2012/0067271 A1* 3/2012 Courvoisier ........... G04B 19/00 116/300

FOREIGN PATENT DOCUMENTS

JP 6179929 B1 8/2017

* cited by examiner

*Primary Examiner* — Sean Kayes
(74) *Attorney, Agent, or Firm* — Idea Intellectual Limited; Margaret A. Burke; Sam T. Yip

(57) ABSTRACT

Provided is a calendar allowing a user to easily read the display for a particular day. A calendar 10 includes a day-display section displaying a day. The day-display section has a plurality of arc FIGS. 28(1) to 28(5), each of which has an arc centered on a vertex of a polygon. The day is sequentially and continuously displayed along the plurality of arc figures.

7 Claims, 4 Drawing Sheets

CALENDAR

FIELD OF THE INVENTION

The present invention relates to a calendar displaying a year, a month, and a day.

BACKGROUND OF THE INVENTION

Conventionally, various calendars have been used. Typical calendars are composed of a group of rows, in each of which the days for one week are displayed horizontally, and these rows are placed side by side vertically. These typical calendars have a structure to let a user read the display of a day from the group of rows. A calendar with an easy-to-read display for a particular day has been desired. Patent Literature 1 describes a calendar that allows a user to easily understand the schedule. This literature is not relevant to the present invention.

CITATION LIST

Patent Literature

Patent Literature 1: JP 6179929 B

SUMMARY OF THE INVENTION

Technical Problem

The present invention aims to provide a calendar allowing a user to easily read the display for a particular day.

Solution to Problem

To achieve the aim, a calendar of the present invention includes: a day-display section that displays a particular day. The day-display section has a plurality of arc figures each having an arc centered on a vertex of a polygon, and the days are sequentially and continuously displayed along the plurality of arc figures.

In the present invention, an arc centered on a vertex of a polygon refers to a part of the circle centered on the vertex of the polygon. The arc figure refers to a figure including the part of the circle.

The polygon may be a pentagon.

Each of the plurality of arc figures may abut on at least another arc figure. Each of the plurality of arc figures in the day-display section may display days of one week.

The calendar may further include a time-display section that displays the time at a center of the polygon.

The calendar may further include a year-display section displaying the year and a month-display section displaying the month.

The day-display section may be displayed on a screen of an image display device.

In the present invention, the image display device is a device for displaying an image or enabling the display of an image thereon, and refers to a mobile phone, a mobile terminal, a personal computer (PC), a game machine, a digital signage, or the like.

Advantageous Effects of Invention

The calendar according to the present invention is configured so that days are displayed sequentially and continuously along the plurality of arc figures. This configuration allows the user to follow the display of days continuously with their eyes. In this way, the user could easily read the display for a particular day. The user also feels the flow of time.

DETAILED DESCRIPTION

First Embodiment

Figure 1:
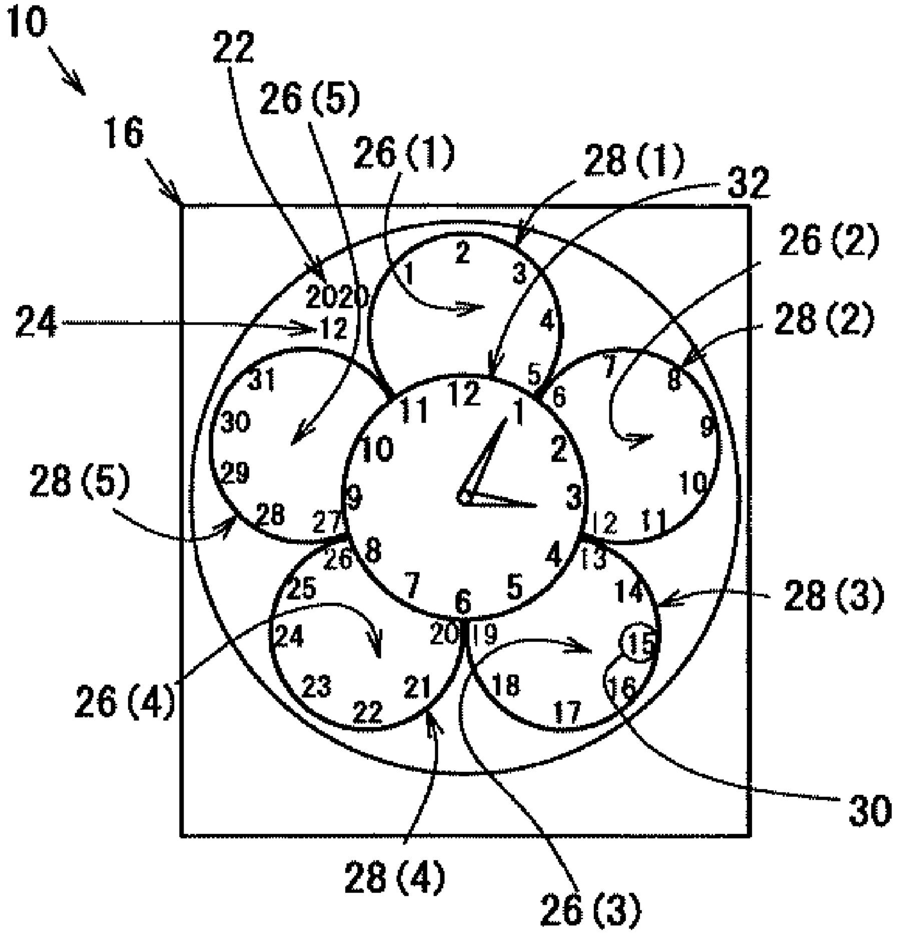
FIG. 1 is a front view of a calendar according to a first embodiment of the present invention.

Referring to FIG. 1, the following describes a calendar according to a first embodiment of the present invention in details. In FIG. 1, reference numeral 10 denotes a calendar according to the present embodiment.

Structure

Screen of Mobile Terminal (Display Substrate)

A calendar 10 is to be displayed on a screen 16 of a not-shown mobile terminal (mobile phone) that is an image display device. Specifically, a mobile terminal (mobile phone), which is an image display device, is a terminal such as a smartphone or a tablet terminal. The mobile terminal includes a computer equipped with a CPU and a memory, and a liquid crystal display controlled by the computer and functioning as a screen. The memory stores a program in advance for displaying the calendar 10 on the screen, and the CPU executes this program. The memory also stores the image data of arc FIGS. 28(1) to 28(5) and the image data of the long and short hands of an analog clock. Executing the program by the CPU causes reading of these image data to display the calendar 10 on the liquid crystal display. That is, the computer in the mobile terminal creates and displays the calendar 10.

Year-Display Section, Month-Display Section, Day-Display Section, and Arc FIGS. 28(1) to 28(5)

The calendar 10 has a year-display section 22, a month-display section 24, and a day-display section on the front face (surface). The year-display section 22 displays the year with a number, the month-display section 24 displays the month with a number, and the day-display section displays a particular day from 1 to the last day of the month. The display for year on the year-display section 22 is created and displayed by a year-display creation unit of the computer in the mobile terminal. The display for month on the month-display section 24 is created and displayed by a month-display creation unit of the computer in the mobile terminal. The display for a particular day on the day-display section is created and displayed by a day-display creation unit of the computer in the mobile terminal. Specifically, the CPU of the computer in the mobile terminal executes a command of acquiring the year, the month and the day (the date) to acquire it, displays the year and month on the liquid crystal display, and also displays the dates from the 1st to the last day of the month based on the acquired year and month. Thus, the CPU of the computer functions as the year-display creation unit, the month-display creation unit, and the day-display creation unit. These year, month, and days are displayed with numbers in this case, and they may be represented in a way other than with numbers as long as it indicates the year, month, and days. The display for days on the day-display section includes the display from 1st day to the last day of the month. In another embodiment, the display may include a part of the days of the month, for example, the days of half the month.

The day-display section has a plurality of number-display sections 26(1) to 26(5). For example, taking December 2020 as an example, the display for year is "2020", the display for month is "12", and the display for days on the day-display section includes the numbers of "1" to "31". The day-display section has five arc FIGS. 28(1), 28(2), 28(3), 28(4) and 28(5), each having substantially the same dimensions centered on the vertices of a regular pentagon, where one arc figure abuts on two other adjacent arc figures. These five arc FIGS. 28(1) to 28(5) each have a schematic pattern of petals. The number-display section 26(1) and the arc FIG. 28(1) represent the first week, the number-display section 26(2) and the arc FIG. 28(2) represent the second week, the number-display section 26(3) and the arc FIG. 28(3) represent the third week, the number-display section 26(4) and the arc FIG. 28(4) represent the fourth week, and the number-display section 26(5) and the arc FIG. 28(5) represent the fifth week. The present embodiment describes the case of the month having five weeks and displaying the 1st day to the last day of the month. The display therefore has the five arc figures. In another case of February having only four weeks or of displaying a part of the days in the month, the display may have arc figures in different number.

The colors of the five arc FIGS. 28(1) to 28(5) are not particularly limited. In the present embodiment, the five arc FIGS. 28(1) to 28(5) have colors of blue, yellow, black, green, and red in the clockwise order, for example. That is, the arc FIG. 28(1) is colored in blue, the arc FIG. 28(2) is colored in yellow, the arc FIG. 28(3) is colored in black, the arc FIG. 28(4) is colored in green, and the arc FIG. 28(5) is colored in red. The location of the arc FIG. 28(1) is not limited to the top in the front view, which may be diagonally above or diagonally below.

In the number-display sections 26(1) to 26(5), numbers indicating days are displayed along the inner circumference of the five arc figures in the ascending order from 1. The numbers for Saturdays are colored in blue, and the numbers for Sundays are colored in red. Numbers other than Saturdays and Sundays are colored in black. In each arc FIGS. 28(1) to 28(5), if the number for Sunday is included, the numbers start from the number for Sunday. In each arc FIGS. 28(1) to 28(5), if the number for Saturday is included, the numbers end with the number for Saturday. In each arc FIGS. 28(1) to 28(5), seven or less numbers for one week are displayed sequentially clockwise. Specifically, the numbers 1 to 5 are displayed clockwise in the ascending order in the arc FIG. 28(1), the numbers 6 to 12 are displayed clockwise in the ascending order in the arc FIG. 28(2), the numbers 13 to 19 are displayed clockwise in the ascending order in the arc FIG. 28(3), the numbers 20 to 26 are displayed clockwise in the ascending order in the arc FIG. 28(4), and the numbers 27 to 31 are displayed clockwise in the ascending order in the arc FIG. 28(5). In two adjacent arc figures, the number corresponding to Saturday displayed in one arc figure and the number corresponding to Sunday displayed in the other arc figure are adjacent to each other. This results in an analogous sequence of numbers from 1 to the last day of the month at substantially the same interval. For example, "12" for Saturday displayed in the arc FIGS. 28(2) and "13" for Sunday displayed in the arc FIG. 28(3) are adjacent to each other. This results in a sequence of numbers from 1 to 31 for the last day of the month at substantially the same interval. In the present embodiment, the sequence of numbers in each arc figure starts from the number for Sunday and ends with the number for Saturday. In another embodiment, other combinations may be used, for example, starting from the number for Monday and ending with the number for Sunday.

Circle

Any of the numbers in the number displays 26(1) to 26(5) is surrounded by a circle 30 indicating that it is the current day. This circle 30 is created and displayed by a circle creation unit of the computer in the mobile terminal. Specifically, the CPU of the computer executes a command of acquiring the date, and displays the circle 30 so as to circle the number corresponding to the acquired date. When the current day is Dec. 15, 2020, "15" is circled in the number display 26(3). The circle 30 may be a filled circle in red, for example.

Clock

The calendar 10 includes a time-display section 32 (clock 32) that displays the time in an area surrounded by the five arc FIGS. 28(1) to 28(5). This time-display section 32 is created and displayed by a time creation unit of the computer in the mobile terminal. Specifically, the CPU of the computer executes a command of acquiring the current time, and displays the acquired current time in the area surrounded by the arc FIGS. 28(1) to 28(5). Thus, the CPU of the computer functions as the time creation unit that creates the time display. The time (clock) in this embodiment is displayed in the mode of an analog clock. In another embodiment, this may be displayed in the mode of a digital clock.

Actions and Advantageous Effects

In response to a user's touch with the icon indicating the calendar on the initial screen (home screen) of the mobile terminal, the year-display creation unit displays the year-display section 22 on the screen 16, the month-display creation unit displays the month-display section 24 on the screen 16, and the day-display section including the arc FIGS. 28(1) to 28(5) is displayed on the screen 16. The time creation unit displays the time-display section 32 (clock 32). The circle creation unit displays the circle 30 indicating the current date.

The calendar 10 according to the present invention is configured so that one arc figure abuts on two other adjacent arc figures, and numbers indicating days are displayed sequentially and continuously along the inner circumference of the five arc FIGS. 28(1) to 28(5). This configuration allows the user to follow the day-display section starting from "1", which is the first day of the month, to "31," which is the last day of the month, continuously with their eyes. In this way, the user easily reads a day on the day-display section. The user also recognizes the location of the current day with the circle 30 in the flow of numbers displayed sequentially. The user also recognizes the time displayed on the time-display section 32 at the same time as the current date, and feels the flow of time. The time-display section 32 displays the time in the mode of an analog clock, in which the rotation direction of the hands of the clock and the display direction of the days on the day-display section are the same. This allows the user to follow the sequence of the days without any discomfort.

Second Embodiment

Figure 2:
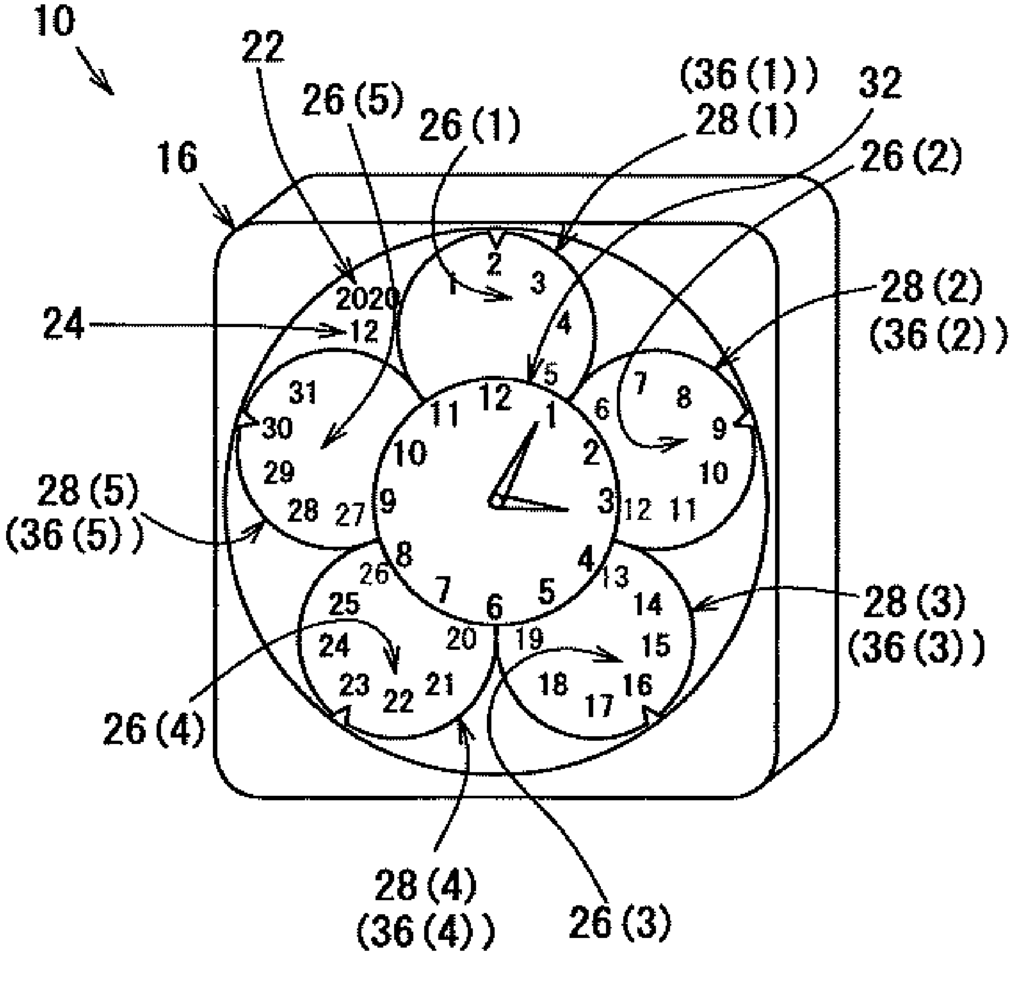
FIG. 2 is a perspective view of a calendar according to a second embodiment of the present invention.

Referring next to FIG. 2, the following describes a calendar according to a second embodiment of the present invention in details. In FIG. 2, reference numeral 10 denotes a calendar according to the present invention. The following description will focus on configurations that differ from the first embodiment, and configurations that are common to the first embodiment will be omitted as appropriate.

Structure

Mount (Display Substrate)

A calendar 10 in FIG. 2 is to be displayed on a mount (base) 16. The mount 16 has a front face and a rear face that have a substantially square shape, and has a predetermined thickness between the front face and the rear face. The mount 16 has a recess on the front face, into which a clock 32 is embedded, and five labels 36(1) to 36(2) are attached around the recess so as to surround the recess (clock 32).

Year-Display Section, Month-Display Section, Number Display, and Arc Figures

The year-display section 22 and month-display section 24 are different from the year-display section 22 and month-display section 24 shown in FIG. 1 in that they are drawn on the labels 34. The number-display sections and the arc figures in FIG. 2 differ from those in FIG. 1 in that the number-display section 26(1) and the arc FIG. 28(1) are drawn on the label 36(1), the number-display section 26(2) and the arc FIG. 28(2) are drawn on the label 36(2), the number-display section 26(3) and the arc FIG. 28(3) are drawn on the label 36(3), the number-display section 26(4) and the arc FIG. 28(4) are drawn on the label 36(4), and the number-display section 26(5) and the arc FIG. 28(5) are drawn on the label 36(5). Each of the five arc FIGS. 28(1) to 28(5) in FIG. 2 is centered on a vertex of a regular pentagon, and has two arcs connected via a notch (V-shaped notch) to have a schematic pattern of a petal. These five arc FIGS. 28(1) to 28(5) therefore have a schematic pattern of a corolla. The year-display section 22 and the like shown in FIG. 2 have the same configuration as the year-display section 22 and the like shown in FIG. 1 except for the above differences. The year-display section 22 and the month-display section 24 are displayed at any position of the mount 16.

Clock

The calendar 10 in FIG. 2 includes a clock 32 that is a time-display section displaying the time in an area surrounded by the five arc FIGS. 28(1) to 28(5). The time (clock) is displayed in the mode of an analog clock. In another embodiment, this may be displayed in the mode of a digital clock. This clock 32 is embedded in the front face of the mount 16 so as to be placed on the front face of the mount 16.

Actions and Advantageous Effects

The calendar 10 according to the present invention in FIG. 2 is configured so that one arc figure abuts on two other adjacent arc figures, and numbers indicating days are displayed sequentially and continuously along the inner circumference of the five arc FIGS. 28(1) to 28(5). This configuration allows the user to follow the day-display section starting from "1", which is the first day of the month, to "31," which is the last day of the month, continuously with their eyes. The user also feels the flow of time.

Third Embodiment

Figure 4:
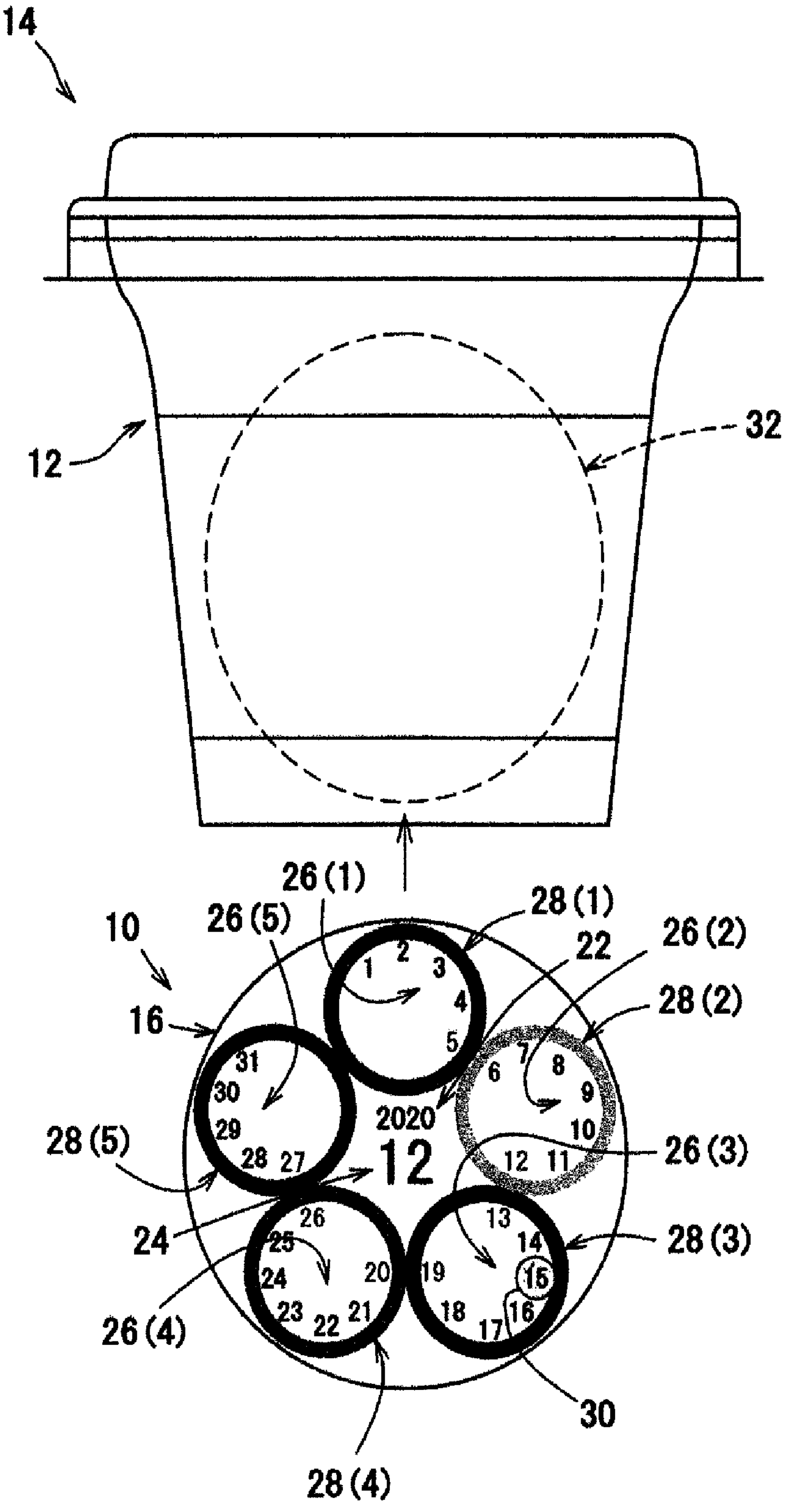
FIG. 4 is a front view of a calendar according to a third embodiment of the present invention, a packaging container and a food product.

In FIG. 4, reference numeral 12 denotes a cup (packaging container) to which a calendar 10 is attached, and reference numeral 14 denotes a pudding (food product) that is pudding ingredients stored in the cup 12.

Structure

Substrate Film

The calendar 10 includes a circular substrate film 16. The substrate film 16 has a rear face (back face), on which adhesive (not shown) is applied, and a release sheet (not shown) is stacked on the rear face via the adhesive. This calendar 10 is configured so that, after peeling off the release sheet, the calendar 10 is attachable on the cup 12 of the pudding 14. The materials of the substrate film 16 and the release sheet are not particularly limited, including paper, polypropylene, or polyester. For example, a preferable material of the adhesive is an acrylic block copolymer. This is because acrylic block copolymers are soft, easily deform to conform to various shapes of an object for adhesion, and have excellent weather resistance. The calendar 10 is prepared by printing a year-display section 22, a month-display section 24, number-display sections 26(1) to 26(5), and a circle 30, by a printer on the substrate film 16.

Year-Display Section, Month-Display Section, Day-Display Section, and Ring Figures The calendar 10 has a year-display section 22, a month-display section 24, and a day-display section on the front face (surface). The year-display section 22 displays the year with a number, the month-display section 24 displays the month with a number, and the day-display section displays a particular day from 1 to the last day of the month. The day-display section has number-display sections 26(1) to 26(5). For example, taking December 2020 as an example, where the display for year is "2020" on the year-display section 22 and the display for month is "12" on the month-display section 24, the display for days on the day-display section includes the numbers of "1" to "31". The day-display section has five ring FIGS. 28(1), 28(2), 28(3), 28(4) and 28(5) centered on the vertices of a regular pentagon, where one ring figure abuts on two other adjacent ring figures. The number-display section 26(1) and the ring FIG. 28(1) represent the first week, the number-display section 26(2) and the ring FIG. 28(2) represent the second week, the number-display section 26(3) and the ring FIG. 28(3) represent the third week, the number-display section 26(4) and the ring FIG. 28(4) represent the fourth week, and the number-display section 26(5) and the ring FIG. 28(5) represent the fifth week. These year, month, and days are displayed with numbers in this case, and they may be represented in a way other than with numbers as long as it indicates the year, month, and days. The display for days on the day-display section includes the display from 1st day to the last day of the month. In another embodiment, the display may include a part of the days of the month, for example, the days of half the month.

The five ring FIGS. 28(1) to 28(5) have different colors of blue, yellow, black, green, and red in the clockwise order. That is, the ring FIG. 28(1) is colored in blue, the ring FIG. 28(2) is colored in yellow, the ring FIG. 28(3) is colored in black, the ring FIG. 28(4) is colored in green, and the ring FIG. 28(5) is colored in red. The colors are in the order of blue, yellow, black, green, and red so as to correspond to the Olympic mark. The location of the blue ring FIG. 28(1) is not limited to the top in the front view, which may be diagonally above or diagonally below.

In the number-display sections 26(1) to 26(5), numbers indicating days are displayed along the inner circumference of the five ring figures in the ascending order from 1. The numbers for Saturdays are colored in blue, and the numbers for Sundays are colored in red. Numbers other than Saturdays and Sundays are colored in black. In each ring FIGS. 28(1) to 28(5), if the number for Sunday is included, the numbers start from the number for Sunday. In each ring FIGS. 28(1) to 28(5), if the number for Saturday is included, the numbers end with the number for Saturday. In each ring FIGS. 28(1) to 28(5), seven or less numbers for one week are displayed in clockwise order. Specifically, the numbers 1 to 5 are displayed clockwise in the ascending order in the ring FIG. 28(1), the numbers 6 to 12 are displayed clockwise in the ascending order in the ring FIG. 28(2), the numbers 13 to 19 are displayed clockwise in the ascending order in the ring FIG. 28(3), the numbers 20 to 26 are displayed clockwise in the ascending order in the ring FIG. 28(4), and the numbers 27 to 31 are displayed clockwise in the ascending order in the ring FIG. 28(5). In two adjacent ring figures, the number corresponding to Saturday displayed in one ring figure and the number corresponding to Sunday displayed in the other ring figure are adjacent to each other. This results in an analogous sequence of numbers from 1 to the last day of the month at substantially the same interval. For example, "12" for Saturday displayed in the ring FIGS. 28(2) and "13" for Sunday displayed in the ring FIG. 28(3) are adjacent to each other. This results in a sequence of numbers from 1 to 31 for the last day of the month at substantially the same interval. The present embodiment describes the case of the month having five weeks and displaying the 1st day to the last day of the month. The display therefore has the five ring figures. In another case of February having only four weeks or of displaying a part of the days in the month, the display may have ring figures in different number. In the present embodiment, the sequence of numbers in each ring figure starts from the number for Sunday and ends with the number for Saturday. In another embodiment, other combinations may be used, for example, starting from the number for Monday and ending with the number for Sunday.

Circle (Marker)

Any of the numbers on the number-display sections 26(1) to 26(5) is surrounded by a circle (marker) 30 that indicates a best-before date, which is one of the expiration dates related to food products. When the best-before date of the pudding 14 is Dec. 15, 2020, for example, "15" in the number-display section 26(3) is circled. The circle 30 is a filled circle in yellow, for example. As a marker, the figure may be filled with fluorescent paint. As a marker, hologram of a figure or a symbol may be displayed in the vicinity of the day corresponding to the best-before date. Preferably, a description indicating that the circle 30 means the best-before date is included in the section to display the product name, the ingredients, and the like (typically affixed to the cup 12).

Actions and Advantageous Effects

A plurality of calendars 10 displaying different best-before dates are prepared. Then, the manufacturer of the pudding 14 selects one of the calendars 10 that displays the best-before date of the pudding 14 and affixes it to an affixing area 32 on the front face, which is the surface of the cup 12 of the pudding 14. The pudding 14 is placed on a store shelf with the calendar 10 attached for displaying. Consumers visiting the store or store clerks will be able to see the pudding 14 and calendar 10. Consumers, for example, recognize the year display on the year-display section 22, the month display on the month-display section 24, and the number surrounded by the circle 30 that are displayed on the calendar 10. Consumers usually know that the date displayed on a food product is the expiration date related to the food product, especially the best-before date. Consumers therefore recognize that the best-before date is specified by the year in the year-display section 22, the month in the month-display section 24, and the number surrounded by the circle 30. For example, in the case of the calendar 10 shown in FIG. 4, the year display is "2020", the month display is "12", and the number surrounded by the circle 30 is "15". In this case, consumers and clerks will recognize that "Dec. 15, 2020" is the best-before date.

This calendar 10 on the pudding 14 is novel and conspicuous to consumers and store clerks. The calendar 10 therefore makes consumers instantly see the calendar 10 displaying the best-before date, and allows them to easily find the display for the best-before date.

This calendar 10 displays the numbers indicating days sequentially and continuously along the inner circumference of the five ring FIGS. 28(1) to 28(5). This configuration allows consumers and others to visually follow the continuous numbers, catch the number surrounded by the circle 30 with their eyes, and easily recognize that the number is the best-before date.

That is descriptions on the embodiments of the present invention with reference to the drawings, and the scope of the present invention is not limited to these illustrated embodiments.

For example, in the above-mentioned calendars 10 shown in FIGS. 1 and 2, the five arc FIGS. 28(1) to 28(5) may be colored of blue, yellow, black, green, and red in the clockwise order. That is, the arc FIG. 28(1) is colored in blue, the arc FIG. 28(2) is colored in yellow, the arc FIG. 28(3) is colored in black, the arc FIG. 28(4) is colored in green, and the arc FIG. 28(5) is colored in red. The location of the blue arc FIG. 28(1) is not limited to the top in the front view.

Figure 3:
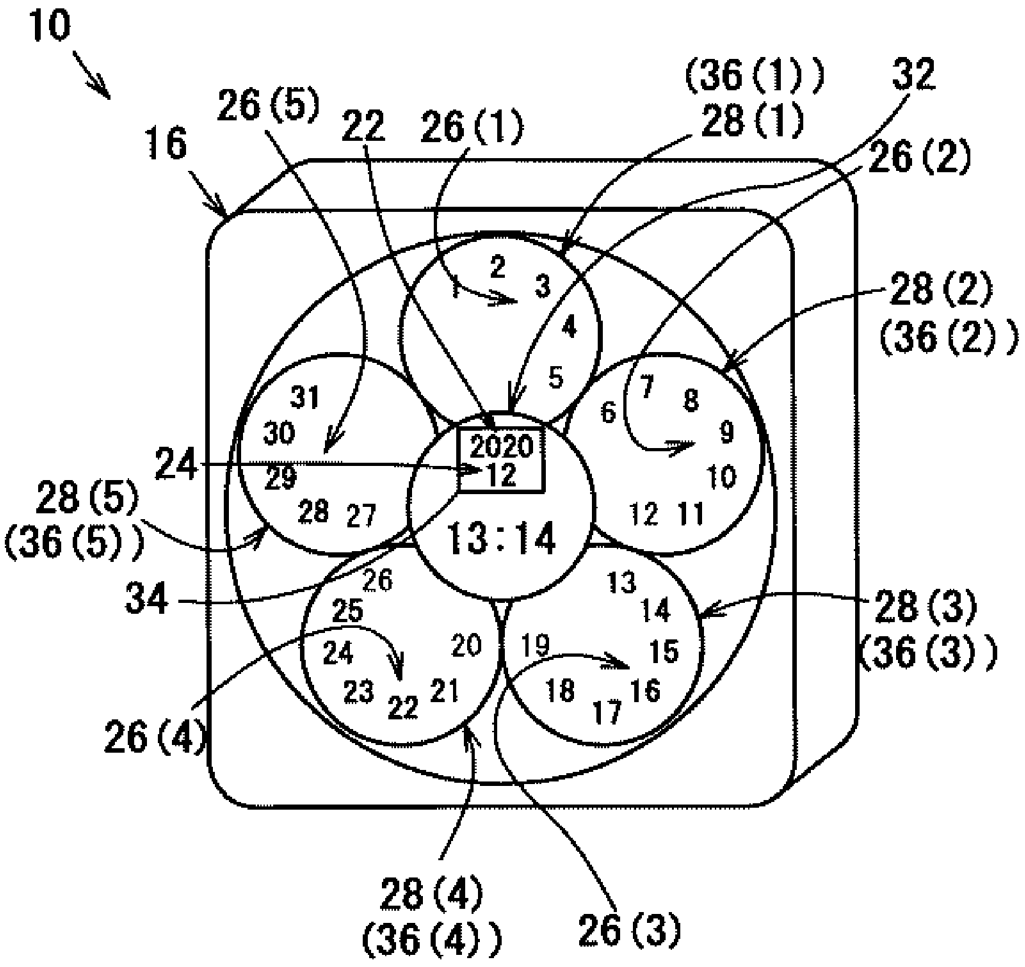
FIG. 3 is a perspective view of a calendar according to another embodiment that is the second embodiment.

In the present invention, the calendar 10 in FIG. 2 may be configured like a calendar 10 in FIG. 3. Specifically, the calendar 10 in FIG. 3 has a smaller time-display section 32 (clock 32) and larger arc FIGS. 28(1), 28(2), 28(3), 28(4), and 28(5) than the calendar 10 in FIG. 2. Compared to the calendar 10 in FIG. 2, the calendar 10 in FIG. 3 has a digital clock 32 and has the year-display section 22 and month-display section 24 at different positions.

In a modified example of FIGS. 1 and 2, the arc figures may have a shape like cherry blossom petals. The colors of the arc figures in the present invention are not limited. In one example, the five arc figures may have the same color.

The first embodiment includes the time-display section 32 (clock 32) at a position surrounded by five arc figures. In another embodiment, the time (clock) is displayed continuously for a predetermined period, followed by the display of an advertisement or a photograph at the display position. The memory of the computer stores the image data of the advertisement or photograph. Following displaying of the time, the CPU of the computer may extract the image data from the memory and display it on the liquid crystal display.

The first embodiment describes the liquid crystal display of the mobile terminal (mobile phone) as an example as the screen of the image display device. The present invention is not limited this embodiment, and the screen may be one of a smart watch.

In the first embodiment, the day-display section may be controlled so as to change its display position in response to the screen operation by the user. For example, when the CPU of the computer of the mobile terminal recognizes a user's screen touch, the CPU rotates the day-display section clockwise (rotates the day-display section clockwise around the time-display section). When the CPU recognizes a user's screen touch again, the CPU decelerates and stops the rotation of the day-display section. Controlling this way allows the user to play a roulette-like game.

In the above embodiments and modified examples, the first week is allocated to the arc FIG. 28(1) or ring FIG. 28(1) for display. In another embodiment, the first week may be allocated to the arc FIG. 28(2) or ring FIG. 28(2) for display.

In the third embodiment, a description indicating that the circle means the best-before date may be given on the front face of the cup 12 of the pudding 14, as in "○: best-before date". This allows consumers to recognize, just by looking the cup 12 on which the calendar 10 is affixed, that the number surrounded by the circle 30 on the calendar 10 is the best-before date.

In the third embodiment, the calendar 10 may not have the circle 30. In this case, the description section, typically affixed to the cup 12, states that marking is to be given on the best-before date. Before or after the manufacturer of the pudding 14 attaches the calendar 10 to the cup 12, they give a marker on or near the best-before date in the number-display sections 26(1) to 26(5) with a marker pen, for example, fluorescent paint in pink. The color of the marker pen is not particularly limited. Instead of using a pen, the marking (marker) may be given with a stamp. Preferably, the material of the substrate film 16 on which the number-display sections 26(1) to 26(5) are printed is one that is easy to apply fluorescent paint, such as paper. In such an embodiment, the number indicating the best-before date is marked after the calendar 10 is printed, which means that the calendar 10 for every year and month may be printed.

In the third embodiment of the calendar 10, in addition to surrounding the best-before date with the circle 30, the date of manufacture may be surrounded with a square marker. In this case, the description section, affixed to the cup 12, states that the circle 30 indicates the best-before date and the square indicates the date of manufacture. Consumers recognize the date of manufacture and best-before date from the circle 30 and square markers, and are able to tell the period from the date of manufacture to the best-before date. Therefore, the consumers are able to tell how many days the product deteriorates in taste.

In the first and second embodiments, the arc figures of the day-display portion make up a shape of petals, and the entire five arc figures make up a shape of the corolla. In comparison with the first and second embodiments, the day-display section may have triangular shapes, so that the five triangles make up a star shape and the days are displayed along this star shape. The above embodiments, which display the days along the petal shapes, are favorable in visibility of the entire dates.

REFERENCE SIGNS LIST

10 Calendar
16 Screen (display substrate)
16 Mount (display substrate)
22 Year-display section
24 Month-display section
26(1), 26(2), 26(3), 26(4), 26(5) Number display
28(1), 28(2), 28(3), 28(4), 28(5) Arc FIG.
30 Circle
32 Clock

The invention claimed is:

1. A calendar comprising a day-display section that displays a day, the day display section having a plurality of arc figures each having an arc centered on a vertex of a polygon, the day being sequentially and continuously displayed along the plurality of arc figures.

2. The calendar according to claim 1, wherein the polygon is a pentagon.

3. The calendar according to claim 1, wherein each of the plurality of arc figures abut on at least another arc figure.

4. The calendar according to claim 1, wherein each of the plurality of arc figures in the day-display section displays the day of a week.

5. The calendar according to claim 1, further comprising a time-display section that displays time at a center of the polygon.

6. The calendar according to claim 1, further comprising:
a year-display section displaying a year; and
a month-display section displaying a month.

7. The calendar according to claim 1, wherein the day-display section is displayed on a screen of an image display device.

* * * * *